United States Patent Office 2,926,202
Patented Feb. 23, 1960

2,926,202

CHLORINATION OF DIALKYLBENZENES

Earl W. Lane, Levittown, Pa., assignor to Rohm & Haas Company, Philadelphia, Pa., a corporation of Delaware No Drawing. Application July 2, 1958
Serial No. 746,088

7 Claims. (Cl. 260—651)

This invention concerns the chlorination of dialkylbenzenes with sulfuryl chloride. The products obtained from the present reaction may be either monochlorinated or dichlorinated compounds as desired, as will be apparent hereinafter.

Dialkylbenzenes have been chlorinated in the past using different methods particularly wherein peroxides such as benzyl peroxide, lauroyl peroxide, and the like, have been employed as catalysts. While in most cases appreciable amounts of products containing clorine on the alkyl groups have been produced, there have also been produced appreciable and frequently predominant amounts of nuclearly substituted chlorine atoms. These products with nuclear chlorine atoms do not have hydrolyzable chlorine atoms and are therefore highly undesirable for many purposes particularly those of the present invention. Also, by methods of the prior art, it has been very difficult and frequently impossible to obtain products containing dichlorinated products wherein the chlorine atoms are located on the alkyl groups. In summation the prior art methods produce predominately nuclearly substituted chlorine atoms or compounds in which there is a single chlorine substituent on the alkyl group, and even in this latter instance the yields appear to be low and the products are contaminated with predominate amounts of other types of nuclearly chlorinated products.

It is the principal object of this invention to provide a method for chlorinating dialkylbenzenes with sulfuryl chloride and a specific catalyst to produce compounds that have one or two chlorine atoms on the alkyl group or groups of the dialkylbenzenes. It is a further object of this invention to provide a method wherein no appreciable amounts of nuclearly substituted chlorine compounds are produced.

The dialkylbenzene reactants of this invention may be illustrated by the following formula

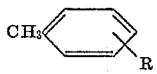

wherein R is an alkyl group of one to twelve carbon atoms. The R group may be positioned in any of the possible special locations ortho, meta, or para to the methyl group. The para position is more conveniently obtained and therefore preferable. There are commercially available mixtures of these reactants in which all three of the spatial locations are represented. These are quite satisfactory for the present purposes. The most common member of the series of reactants contemplated in this invention is xylene which is a preferred reactant.

The R groups, beside being located at any possible position on the benzene ring, may also exhibit any of the possible isomeric forms. For instance, if R represents octyl this group may be n-octyl, iso-octyl, 2,4-dimethylhexyl, 2,2,4-trimethylpentyl 2,2,4,4-tetramethylbutyl, and the like. The straight-chained members are somewhat preferred. Typical of the groups that may be employed as R are methyl, ethyl, isopropyl, t-butyl, pentyl, isohexyl, t-octyl, decyl, and dodecyl groups. Typical reactants having the formula

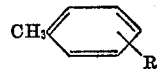

include xylene, methylbutylbenzene, methyldodecylbenzene, methyloctylbenzene, methylpropylbenzene, and methyldecylbenzene.

There are two types of products that may be produced by the present invention. One product contains a single chlorine atom. This product is usually produced in a minor amount. The other product produced by the process of this invention contains two chlorine atoms. This product is produced in a major amount and frequently is substantially quantitative in extent. The product containing two chlorine atoms is the preferred one. The products of this invention are known and have known utilities. These compounds may be converted to dibasic acids and esters and used in plasticizer and lubricant formulations. They may be converted to bismercaptans and used as free radical chain modifiers in polymerization reactions. These may be converted to bisisothiocyanates and used as fungicides in fungicidal formulations. They may be converted to bis quaternary ammonium compounds and employed in bactericidal situations.

The present reaction must be conducted in the presence of an organic azo-type catalyst, such as azodiisobutyronitrile,
dimethylazodiisobutyrate,
azobismethylbutyronitrile,
azobisethylpyronitrile,
azobisdimethylvaleronitrile,
azobismethylcapronitrile,
azobisisobutylmethylvaleronitrile,
azobisisopropylmethylbutyronitrile,
azobisdimethylcapronitrile,
azobisdicyclopentamidecarbonitrile,
azobiscyclopropylpropionitrile,
azobismethylphenylpropionitrile,
carbamylazodimethylvaleramide,
azobiscyclohexylpropionitrile,
azobisdiisobutyramide,
azobisdimethyldiisobutyramide,
azobiscyclopropylpropionamide,
azodiisobutyrodiethylamide,
dihexylazodiisobutyrate, and the like. There should be employed at least .003 mole of catalyst per mole of sulfuryl chloride. It is desirable to use at least about 0.020 mole of catalyst per mole of sulfuryl chloride, particularly if it is desired to obtain substantially quantitative amounts of the dichlorinated product.

It will be apparent that if the monochlorinated product is desired there should be reacted one mole of sulfuryl chloride for every mole of the dialkylbenzene. If the dichlorinated product is predominately desired, then two moles of sulfuryl chloride should be reacted with every mole of the dialkylbenzene. The latter ratio is preferred since the dichlorinated product is preferred.

The present reaction may be satisfactorily consummated in the range of 25° to 70° C., preferably, about 30° to about 60° C. If desired, there may be employed a volatile solvent of the chlorinated hydrocarbon type. Suitable in this respect are chloroform, carbon tetrachloride, methylene dichloride, ethylene dichloride, and the like. At the conclusion of the reaction the solvent may be readily removed by known methods such as by stripping, preferably at reduced pressures. As the reaction progresses hydrogen chloride and sulfur dioxide are liberated. These may be collected in order to maintain a maximum economic process. The cessation of evolution of these gases is an indication of the completion of the reaction.

The products of this invention are obtained in high yields and conversions of 80% and greater are consistently obtained and yields that are substantially quantitative are repeatedly achieved. The products are isolated by stripping off the unusued reactants, washing the product with water, aqueous 10% sodium carbonate, and finally water again. The products may then be dried over anhydrous magnesium sulfate, filtered, and distilled.

The method of this invention may be more clearly understood by reference to the following examples which are offered by way of illustration and not by way of limitation. Parts by weight are used throughout.

*Example 1*

There are charged to a 2-liter flask equipped with a stirrer, thermometer, gas inlet tube, and an ice-salt condensor the outlet of which is connected by glass and rubber tubing to a jar of water 420 parts of xylene, 1080 parts of sulfuryl chloride and 5.25 parts of azodiisobutyronitrile. The system is swept with nitrogen and the mixture is heated to 32° to 55° C. for eight hours. The excess sulfuryl chloride is stripped out of the reaction mixture by heating to 45° C. under water vacuum. The product is dissolved in benzene, washed with water, washed with aqueous 10% sodium carbamate, and finally washed again with water. The product is dried over anhydrous magnesium sulfate, is filtered, and finally distilled at 148° to 170° C. at 25 mm. absolute pressure. The product contains 40.7% total chlorine and 39.1% hydrolyzable chlorine. The product is identified as bis(chloromethyl)benzene.

In a similar way, there are produced chloromethylchlorododecylbenzene and chloromethylchlorooctylbenzene from methyldodecylbenzene and methyloctylbenzene, respectively.

*Example 2*

There are introduced into a reaction vessel 296 parts of methylbutylbenzene, 540 parts of sulfuryl chloride, and 2.00 parts of azodiisobutyramide. The system is swept with nitrogen, and the reaction mixture is heated between 38 and 62° C. for six hours. Excess sulfuryl chloride is removed by stripping at reduced pressure and the product is dissolved in benzene, washed with water, aqueous 10% sodium carbonate, and water again. The product is dried over anhydrous sodium sulfate, filtered, and distilled. The product corresponds to chloromethylchlorobutylbenzene.

There are prepared in an analogous way chloromethylchloropropylbenzene and chloromethylchlorodecylbenzene from methylpropylbenzene and methyldecylbenzene, respectively.

I claim:
1. A method for the preparation of chloromethylchloroalkylbenzenes, in which the alkyl portion contains from one to twelve carbon atoms which comprises reacting methylalkylbenzene with sulfuryl chloride at a temperature of about 25° to about 70° C. in the presence of an organic azo compound.

2. A method for the preparation of chloromethylchloroalkylbenzenes, in which the alkyl portion contains from one to twelve carbon atoms which comprises reacting one molecular equivalent of methylalkylbenzene with substantially two molecular equivalents of sulfuryl chloride at a temperature of about 25° to about 70° C. in the presence of an organic azo compound.

3. A method for the preparation of chloromethylchloroalkylbenzenes, in which the alkyl portion contains from one to twelve carbon atoms which comprises reacting one molecular equivalent of methylalkylbenzene with substantially two molecular equivalents of sulfuryl chloride at a temperature of about 25° to about 70° C. in the presence of azodiisobutyronitrile.

4. A method for the preparation of chloromethylchloroalkylbenzenes, in which the alkyl portion contains from one to twelve carbon atoms which comprises reacting one molecular equivalent of methylalkylbenzene with substantially two molecular equivalents of sulfuryl chloride at a temperature of about 25° to about 70° C. in the presence of azodiisobutyramide.

5. A method for the preparation of bis(chloromethyl)benzene which comprises reacting substantially one molecular equivalent of xylene with substantially two molecular equivalents of sulfuryl chloride at a temperature of about 25° to 70° C. in the presence of an organic azo compound.

6. A method for the preparation of chloromethylchlorooctylbenzene which comprises reacting substantially one molecular equivalent of methyloctylbenzene with substantially two molecular equivalents of sulfuryl chloride at a temperature of about 25° to about 70° C. in the presence of an organic azo compound.

7. A method for the preparation of chloromethylchlorododecylbenzene which comprises reacting substantially one molecular equivalent of methyldodecylbenzene with substantially two molecular equivalents of sulfuryl chloride at a temperature of about 25° to about 70° C. in the presence of an organic azo compound.

References Cited in the file of this patent
UNITED STATES PATENTS

| | | |
|---|---|---|
| 2,302,228 | Kharasch et al. | Nov. 17, 1942 |
| 2,680,763 | Brubaker | June 8, 1954 |